United States Patent [19]
DeLigt et al.

[11] 3,947,206
[45] Mar. 30, 1976

[54] CORRUGATING APPARATUS

[75] Inventors: John DeLigt, Covington; David F. Talbert, Millboro, both of Va.

[73] Assignee: Westvaco Corporation, New York, N.Y.

[22] Filed: Oct. 10, 1974

[21] Appl. No.: 513,748

[52] U.S. Cl. ................. 425/388; 425/396; 425/369
[51] Int. Cl.² .......................................... B29D 7/14
[58] Field of Search ........... 425/369, 396, 383, 363, 425/388

[56] References Cited
UNITED STATES PATENTS

| | | | |
|---|---|---|---|
| 2,055,877 | 9/1936 | Palmer | 425/335 X |
| 2,429,482 | 10/1947 | Munters | 425/115 X |
| 2,905,969 | 9/1959 | Gilbert et al. | 425/388 X |
| 3,004,289 | 10/1961 | Missbach | 425/384 |
| 3,077,222 | 2/1963 | Shanley | 425/363 X |
| 3,126,580 | 3/1964 | Paschke | 425/388 |
| 3,184,793 | 5/1965 | Plourde | 425/388 X |
| 3,226,458 | 12/1965 | Graff et al. | 425/369 X |
| 3,671,361 | 6/1972 | Morrison | 425/369 X |
| 3,837,973 | 9/1974 | Asakura et al. | 425/388 X |
| 3,854,861 | 12/1974 | Worrall | 425/388 X |

Primary Examiner—J. Howard Flint, Jr.
Attorney, Agent, or Firm—W. Allen Marcontell; Richard L. Schmalz

[57] ABSTRACT

In a sheet corrugating machine used to fabricate corrugated paper board from rolls of sheet stock, the formed sheet is held tightly to the undulating surface of one corrugating roll between the corrugating nip and a liner sheet application nip by a vacuum system within the corrugating roll. The corrugating roll vacuum system comprises apertures through the roll shell within the corrugation valleys. Such apertures communicate with longitudinal conduits disposed about the internal periphery of the roll shell and extended through one axial end of the roll. A stationary, sliding seal vacuum box evacuates only those conduits rotatively passing through the desired arc thereby leaving the roll journals free to simultaneously conduct roll heating steam therethrough.

12 Claims, 11 Drawing Figures

CORRUGATING APPARATUS

BACKGROUND OF THE INVENTION

1. Field Of The Invention

The present invention relates to the art of continuously forming sheet material into an undulating pattern.

More particularly, the present invention relates to an improved apparatus for nip forming paper and plastic materials into a corrugated sheet.

2. Description Of The Prior Art

Corrugated paperboard is a structural product fabricated from two or more laminae of paper sheet, usually in the order of 0.009 inch (0.229 mm) thick, one of the laminae being formed to an undulating or "corrugated" pattern. Relative to one or both faces of the corrugated lamina, a "liner" sheet is adhesively secured to the corrugation crests.

The fabrication of corrugated board is carried out on machinery of a generally standardized design comprising two steam heated corrugating rolls, a pressure roll and an adhesive application roll system.

The corrugating rolls are hollow cylinders mounted for rotation about the axes thereof, the surface of said cylinders being shaped to the desired corrugation pattern.

Each period of undulation in the corrugation pattern is characterized as a "flute" and on the corrugating rolls, the flutes are disposed parallel with the roll axes.

The two corrugating rolls are disposed relative to each other whereby the respective flutes intermesh gear fashion to create a rolling nip therebetween. The heat and pressure of this nip on a paper sheet drawn therein forces a permanent set in the sheet with the corrugation pattern.

After emerging from the corrugating nip, the sheet is held tightly to the undulating surface of one corrugating roll by a number of "fingers" distributed along the roll length. The objective of these fingers is to precisely position the fluted sheet for application of adhesive to the crests thereof. Such adhesive is applied as a film wiped from the surface of a glue applicator roll as the flute crests pass tangently thereagainst.

Subsequently, around the one corrugating roll periphery, the adhesive carrying flute crests enter a nip with a smooth surface pressure roll into which is fed a liner sheet. The consequent nip pressure between the adhesive carrying flute crests of the corrugated sheet and the liner sheet bonds the two together to form a "single face" board.

Thereafter, the board is separated from the one corrugating roll surface for subsequent processing such as application of another liner sheet to flute crests on the opposite side of the corrugated sheet to form "double face" board.

The use of fingers to hold the corrugated sheet to the corrugating roll surface betwen the corrugating nip and the liner board nip constitutes the source of numerous operational and product integrity problems.

One such problem is the fact that a continuous score crease is pressed into the flute crests by internal sheet stresses which force the sheet strongly against the narrow finger edge. Such score creases ultimately become lines of weakness and failure for the board product.

Also, as a consequence of sheet stresses against the fingers, is a longitudinal bowing of the sheet flutes. For this reason, the finger objective is not entirely achieved since such bowing of the flutes represents a dimensional variation along the flute length which the fixed dimension cylindrical glue applicator roll cannot accommodate. Accordingly, no adhesive is applied to the flute crests in the proximity of the fingers and too much adhesive is applied to the center span between the fingers.

If the corrugated sheet is also coated with a polymer plastic for water proofing and other properties, it is heated to a tacky consistency for liner bonding in lieu of adhesive. In this state, the plastic wipes off onto the fingers and accumulates to the point of sheet damage.

For the foregoing reasons, corrugating roll fingers have been merely tolerated as a poor compromise to achieve necessary objectives. Although the use of vacuum to secure the corrugated sheet to the roll surface has been considered as an alternative to fingers, the concept has not received industry acceptance because of mechanical conflict with roll heating steam which is delivered to the roll interior. Prior art systems have presented the industry with a one or the other choice which has heretofore been resolved in the favor of steam heating.

Accordingly, it is the objective of the present invention to disclose and describe a corrugating system whereby the sheet may be simultaneously held to the corrugating roll surface by vacuum and also heated by flowing steam through the roll interior.

Another objective of the present invention is to teach the construction of a corrugating roll whereby a select, fixed position arc of the roll may be surface evacuated as the roll rotates about the axis thereof.

Another objective of the present invention is to teach the construction of a corrugating roll whereby a vacuum draft system is inexpensively disposed adjacent the interior periphery of the cylindrical shell and in intimate heat transfer contact therewith, the roll axis being left free for the disposition of a pressurized flow journal for steam.

SUMMARY OF THE INVENTION

According to the present invention, the sheet transfer roll of the corrugating pair is provided with several peripherial belts of holes drilled through the corrugated cylindrical shell, the belts being spaced along the roll length by distances generally corresponding to the prior art practice of lateral spacing between fingers. The drilled holes are positioned within the flute valleys thereby longitudinally aligning all holes of the several belts into a multiplicity of longitudinally extending rows.

Each row of drilled holes is partitioned off from the remaining internal roll volume by a conduit wall extending the roll length. At one roll end, the conduit walls are sealed. At the other roll end, the conduit walls are sealed to the roll end cap; the end being drilled to open the conduit interior to the end cap exterior.

The roll end cap is also provided with a sliding seal surface for sealing cooperation with a stationary suction box.

In the foregoing manner, a sheet holding vacuum system is operationally sustained without the necessity of utilizing the entire roll interior volume or of foreclosing the use of the roll journal for steam heat delivery.

The system may be inexpensively constructed and even adapted to existing corrugating rolls by the use of relatively light gauge corrugated sheet metal to line the internal shell periphery; the flute crests being sealed to the shell wall by any convenient means and the flute valleys aligned with the drilled hole rows to provide the requisite conduit. If a heat conductive bonding agent such as welding is used to seal the flute crests to the shell wall, a highly efficient heat conductance may be sustained between the roll interior steam chamber and the exterior surface in contact with the paper sheet.

Even greater heat transfer efficiency may be achieved by a ring and tube embodiment of the invention whereby the greater majority of the interior shell surface is free to direct contact with interior chamber steam. In this embodiment of the invention, each belt of drilled holes is provided with an interior ring, the several rings being interconnected by longitudinally extending tubular conduits penetrating the ring annulus. The rings are secured and sealed to the shell interior wall in alignment with the belts of drilled holes which are extended into the ring annulus and a respective conduit interior. One longitudinal end of the conduits is sealed with the other opened to the roll cap exterior as described relative to the corrugated flute conduits.

BRIEF DESCRIPTION OF THE DRAWINGS

Relative to the drawing wherein like reference characters designate the same or similar elements throughout the several figures.

DESCRIPTION OF THE PREFERRED EMBODIMENTS

Figure 1:
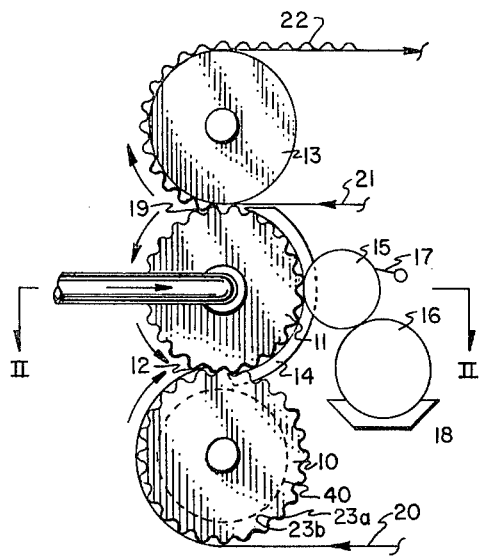
FIG. 1 is a schematic representation of the prior art apparatus for fabricating single face corrugated paperboard.
Figure 2:
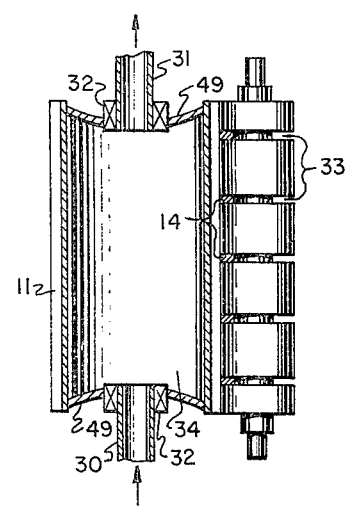
FIG. 2 illustrates a section of the corrugating transfer roll taken through out line II—II of FIG. 1.
Figure 3:
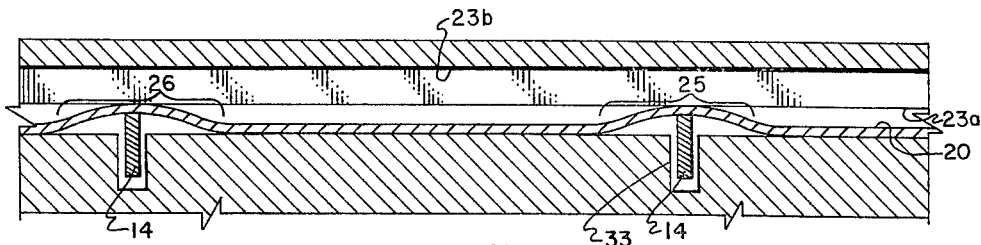
FIG. 3 is an enlarged view of the corrugating apparatus dynamic position of the paper sheet relative to corrugating roll shell, the retaining fingers and the glue applicator roll.
Figure 4:
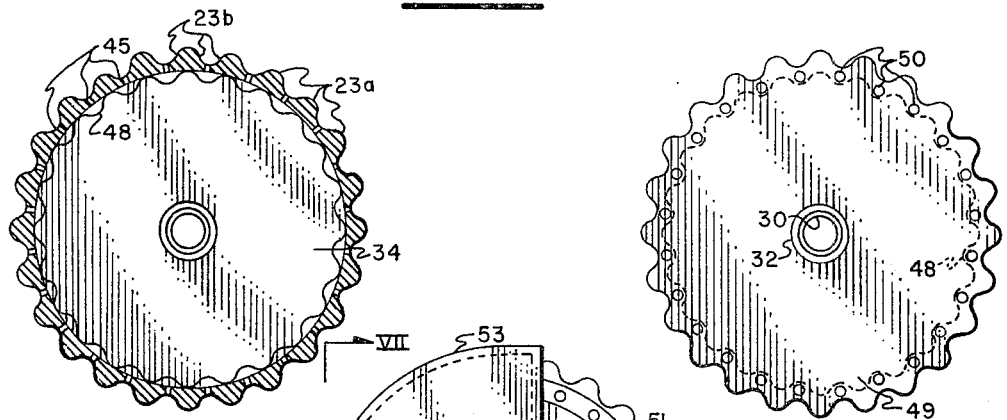
FIG. 4 illustrates an axial end section of a corrugating roll constructed pursuant to the present invention.
Figure 5:
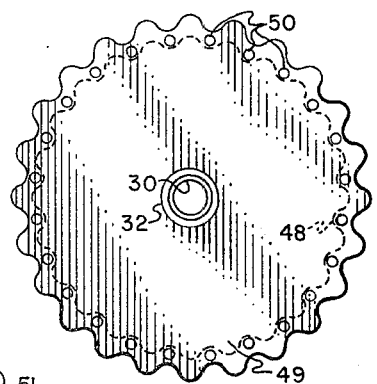
FIG. 5 illustrates a full axial end view of the corrugating roll pursuant to the present invention.
Figure 6:
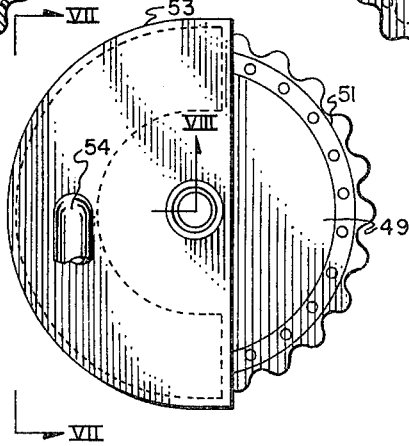
FIG. 6 illustrates an axial end view of the present corrugating roll equipped with a cooperative suction box.

To form a base of reference for the following description of the invention and preferred embodiments thereof, attention is first directed to the prior art FIGS. 1 through 3.

The corrugating apparatus of FIG. 1 comprises two corrugating rolls 10 and 11 and pressure roll 13. The intermediate corrugating roll 11 is also a transfer roll for the corrugating sheet 20 between the corrugating nip 12 and a liner sheet application nip 19.

Sheet restraining fingers 14 extend into relief slots 40 cut around the periphery of corrugating roll 10 to direct the corrugating sheet 20 away from the roll 10 and onto the surface of roll 11. Further to this purpose, the fingers continue from the corrugating nip 12 around the periphery of transfer roll 11 to the liner nip 19.

Intermediate of the nips 12 and 19, adhesive is applied to the corrugated flute crests by an applicator roll 15 of the adhesive application assembly which further comprises a fountain roll 16, a doctor blade 17 and a glue pan 18. The fountain roll 16 picks up a coating of adhesive from the constant level reservoir in glue pan 18 and transfers a portion thereof to the surface of applicator roll 15. Intermediate of the adhesive transfer tangent and the corrugation crest application tangent is a doctor blade 17 which very precisely regulates the adhesive film thickness on applicator roll 15 thereby controlling the exact amount of adhesive applied to the flute crests.

Coincident with the technique of controlling the applied adhesive quantity with fingers 14, the applicator roll must be provided with relief slots 33.

The fact that no adhesive may be applied beneath the finger edge area is an accepted compromise. What is unacceptable, however, is that because of spring stresses in the corrugated sheet, the flute crest of the sheet (FIG. 3) moves away from the roll surface flute crest 23a between the fingers 14 notwithstanding the presence thereof to leave a greater region 25 devoid of adhesive. Because the glue application mechanics require a wiping action between the roll and the flute crest surface, the applicator roll cannot be used to press the sheet against the corrugating roll surface.

Subsequent to application of the adhesive, the corrugated sheet 20 is delivered into the nip 19 along with a liner sheet 21 which adheres to the flute crests under the nip pressure. The laminated combination of the sheets 20 and 21 emerging from the nip 19 is single face board 22.

To assist the corrugated formation, the roll 11 is heated by steam delivered by pipe 30 to the roll interior chamber 34 through pressure sealing journals 32. To minimize the formation of condensate, steam removal pipe 31 permits the use of a flowing circuit.

Figure 7:
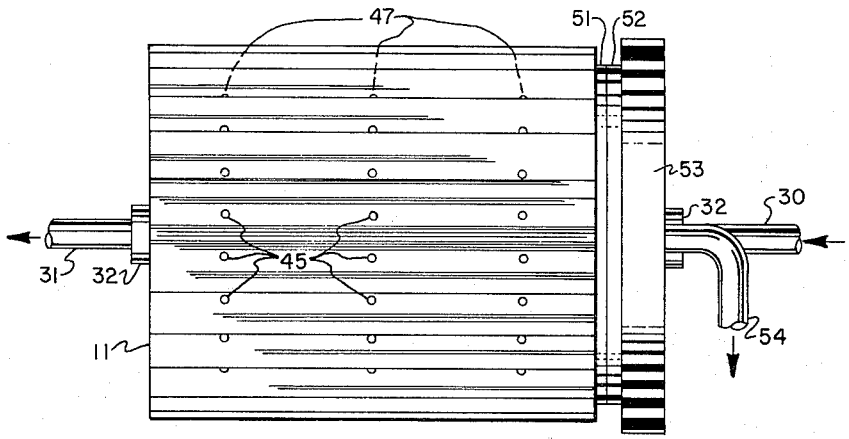
FIG. 7 illustrates a cylindrical face view of the present invention as seen from the view plane VII—VII of FIG. 6.

Relative to the present invention, the restraining fingers 14 are replaced by a vacuum system which comprises a multiplicity of drilled apertures 45 through the corrugated surface shell of roll 11. These apertures 45 are located in the flute valleys 23b and arranged in several, laterally spaced, circumferential belts 47 (FIG. 7) around the roll periphery. The lateral frequency of the hole 45 belts may be more than prior art finger spacing since the entire interproximate volume between the sheet 20 and the roll surface is evacuated by the system and the resulting atmospheric pressure differential uniformly presses the entire sheet area against the roll surface.

To partition the holes 45 in the roll shell from the interior steam chamber 34, the interior periphery of the shell is lined with corrugated sheet metal; the valleys thereof being aligned with laterally adjacent apertures 45 of the respective belt 47 to serve as a continuous evacuation conduit.

For best heat transfer and pressure sealing efficiency between the flute valleys, the flute crests should be secured to the shell interior wall by a joint of high heat conductivity such as welding or brazing.

At one axial end of the roll 11, the evacuation conduits are sealed as by brazing a plug ring.

Figure 8:
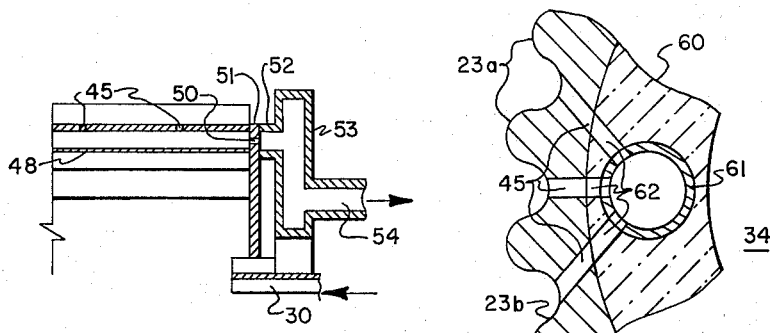
FIG. 8 illustrates a partial section of the present invention as seen from cutting plane VIII—VIII of FIG. 6.

At the other axial end of the roll 11, the evacuation conduits are sealed from the steam chamber 34 but communicated through the roll end cap by apertures 50. Such apertures 50 are extended through a smooth face sealing ring 51 which cooperates with a similar sliding seal ring 52 (FIGS. 7 and 8) secured to stationary suction box 53.

The suction box 53 is a simple chamber manifold extending arcuately over that portion of the roll arc that is in need of evacuation. By incorporating an arcuate, sliding damper valve adjacent the suction box sealing 52, the arcuate degree of roll surface evacuation may be adjusted within the maximum arc.

As a stationary element, the suction box 53 may be conveniently secured to the roll journal housing, for example. Vacuum line 54 is connected to any convenient vacuum source such as a pump not shown. Only a partial vacuum is adequate to perform the objective task, therefore, the sliding seals need not be absolute nor the equipment structure heavy.

Figure 10:
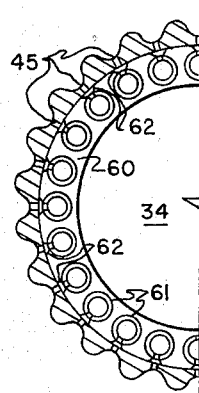
FIG. 10 illustrates a partial end view of the FIG. 9 embodiment.
Figure 9:
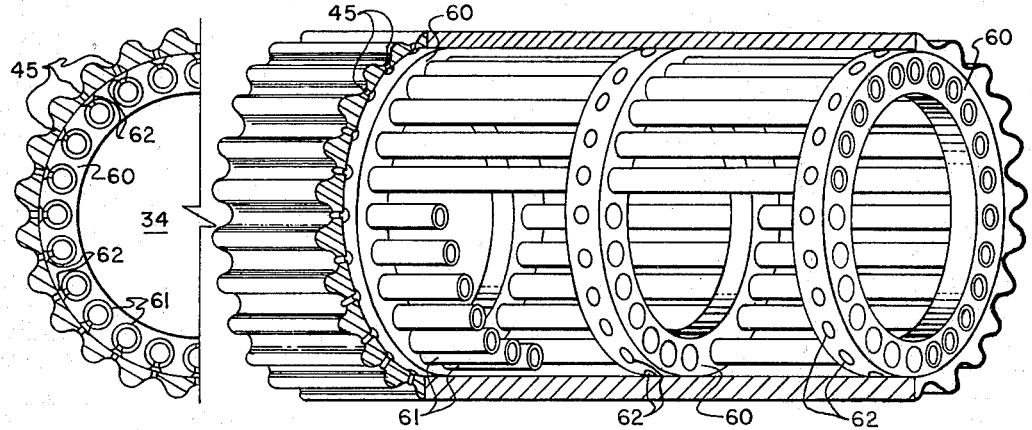
FIG. 9 illustrates a sectionalized isometric view of a second embodiment of the present invention.

FIGS. 9 and 10 illustrate an embodiment of the invention suited for even greater heat transfer efficiency between the roll shell and the steam chamber 34. In this embodiment, the vacuum system takes the form of a ring cage wherein the several rings 60 are positioned interior of the roll 11 shell periphery opposite each aperture belt 47.

Longitudinally, the rings are fitted with tubes 61 which are sealed at one axial end and open at the other through the roll end cap 49.

Both, rings 60 and tubes 61, are drilled for apertures 62 to communicate the shell apertures 45 with the interior of tubes 61.

The system is otherwise evacuated by a vacuum pump, suction box 53 and sliding seals 51 and 52 as described relative to the FIGS. 4 through 8 embodiment.

Figure 11:
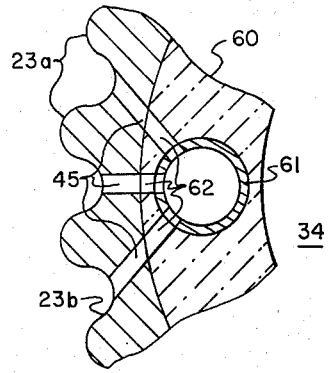
FIG. 11 illustrates a modified detail of the present invention.

FIG. 11 illustrates a modified detail of the FIGS. 9 and 10 embodiment of the invention wherein the number of vacuum tubes 61 is minimized by providing for the evacuation of several flute valleys 23b with a single tube 61. In this case, the apertures 45 and 62 may be drilled radially of the tube 61 axis rather than radially of the roll axis.

It should be obvious that the FIG. 11 detail may also be appropriated for the FIGS. 4 through 8 invention embodiment by drilling the apertures 45 of several adjacent roll shell flute valleys 23b into a single liner flute conduit.

Having described our invention and the several preferred embodiments thereof, we claim:

1. An apparatus for continuously forming sheet material into a surface profile of undulating pattern within a meshing nip between two cylindrical rolls having cylindrical surface profiles corresponding to said undulating pattern, one of said two rolls further comprising:
   a rotatably mounted hollow cylindrical shell surrounding an interior void space and having a substantially circular interior periphery and an undulating exterior surface periphery, said shell being perforated by a multiplicity of apertures disposed in valley portions of said undulating surface;
   a plurality of fluid conduits disposed within said interior space, secured non-rotatively relative to said shell longitudinally parallel with the cylindrical axis of said roll and adjacent said interior periphery, one end of said conduits being sealed closed and the other end being sealed to but open through a smooth face sliding seal ring;
   said shell perforation apertures being in fluid communication with said conduits;
   stationary vacuum chamber means having a fluid sealing surface cooperative with said sliding seal ring, said fluid sealing surface extending over and serving an arcuate portion of said seal ring; and,
   vacuum source means connected to said chamber means to evacuate atmospheric fluid from said conduits over an arcuate portion of said shell exterior surface coextensive with the arcuate portion of said seal ring served by said stationary vacuum chamber sealing surface during rotation of said one roll.

2. Apparatus as described by claim 1 where said interior space is sealed at respective axial ends thereof to form a pressure tight chamber therein, said fluid conduits passing through one of said end seals and fluid flow journal means rotatably supporting said roll through which a pressurized heating fluid is conducted into said chamber.

3. Apparatus as described by claim 2 wherein an undulating liner sheet of high heat conductivity is secured to the interior periphery of said shell, undulations of said liner sheet forming valleys between crests thereof, the crests of one face of said liner sheet having a high heat conductive contact with said interior periphery, the valleys of said liner sheet comprising said fluid conduits.

4. Apparatus as described by claim 3 wherein a plurality of longitudinally adjacent shell apertures communicate with the same fluid conduit.

5. Apparatus as described by claim 2 wherein said fluid conduits comprise a cage of tubes secured through a plurality of rings that are aligned in planes substantially normal to said roll axis and peripherial apertures in said rings disposed to communicate shell apertures in the proximity of respective ring planes with said tubes.

6. Apparatus as described by claim 5 wherein a plurality of radially adjacent shell apertures communicate with the same tube.

7. A steam heated paper corrugating roll wherein heating steam is introduced to an interior chamber within said roll through a roll supporting journal seal, said roll comprising a shell element having a corrugated exterior surface profile and a cylindrical internal periphery, said shell having caps at respective axial ends thereof, said chamber being delineated by said internal periphery and said caps, the improvement comprising:
   perforations through said shell located within valleys of said surface profile corrugation, said perforations opening into a plurality of longitudinally extending conduits non-rotatively secured relative to said shell and circumferentially distributed within said chamber adjacent said internal shell periphery, said conduits passing through one of said end caps as apertures having substantially equidistant spacing from the axis of said shell element, said perforations, conduits and apertures being pressure sealed from said chamber, said apertures having terminal openings through the face of a smooth finish annual sealing surface disposed in a plane substantially normal to said shell axis.

8. A paper corrugating roll as described by claim 7 wherein said plurality of conduits comprise the valleys of corrugation flutes respective to one side of a heat conductive sheet element formed to a corrugated surface profile.

9. A paper corrugating roll as described by claim 8 wherein crests of said corrugated sheet element adjacent said interior shell periphery are sealed thereto with a heat conductive junction.

10. A paper corrugating roll as described by claim 7 wherein said plurality of conduits comprise tube elements secured to annular ring members, said ring members being secured adjacent said internal shell periphery in planes substantially normal to said shell axis, said apertures being extended through said ring members into said tube elements.

11. A paper corrugating roll as described by claim 10 wherein the space volume of said pressure tight chamber extends around and between adjacent tube elements and into direct contact with said internal shell periphery.

12. A paper corrugating roll as described by claim 7 further comprising a vacuum chamber rotationally secured to roll supporting rotational journal means and disposed for stationary positionment during rotation of said roll, said vacuum chamber having vacuum source conduit means and sealing surface means cooperative with said annular sealing surface, said vacuum chamber sealing surface means extending over an arcuate portion of the terminal openings of said plurality of conduits to permit a sealed communication between conduits within said arcuate portion and said vacuum source during rotation of said roll.

* * * * *

UNITED STATES PATENT OFFICE
CERTIFICATE OF CORRECTION

PATENT NO. : 3,947,206
DATED : March 30, 1976
INVENTOR(S) : John DeLigt and David F. Talbert It is certified that error appears in the above-identified patent and that said Letters Patent are hereby corrected as shown below:

Column 6, line 16 (Claim 2, line 1), delete "where" and insert therefor --wherein--. Column 6, line 63 and 64 (Claim 7, lines 20 and 21), delete "annual" and insert therefor --annular--.

Signed and Sealed this eighth Day of June 1976

[SEAL]

Attest:

RUTH C. MASON
*Attesting Officer*

C. MARSHALL DANN
*Commissioner of Patents and Trademarks*